(12) United States Patent
Jiang et al.

(10) Patent No.: US 7,190,536 B2
(45) Date of Patent: Mar. 13, 2007

(54) COLOR FILTER DISC AND PROCESS OF MAKING THE SAME

(75) Inventors: Zhou Jiang, Dong-Guan (CN);
Yu-Ting Jiang, Dong-Guan (CN);
Cai-Jin Mao, Dong-Guan (CN);
Zheng-Tao Yan, Dong-Guan (CN)

(73) Assignee: Asia Optical Co., Inc., Taichung (TW)

( * ) Notice: Subject to any disclaimer, the term of this patent is extended or adjusted under 35 U.S.C. 154(b) by 560 days.

(21) Appl. No.: 10/738,061

(22) Filed: Dec. 16, 2003

(65) Prior Publication Data

US 2004/0145823 A1 Jul. 29, 2004

(30) Foreign Application Priority Data

Jan. 29, 2003 (CN) ............................ 92 1 02035

(51) Int. Cl.
*G02B 5/22* (2006.01)
(52) U.S. Cl. ............... 359/891; 359/885; 359/889; 348/743; 356/418; 353/84; 362/293
(58) Field of Classification Search ............... 359/891, 359/892, 885, 889; 348/743; 356/418; 353/84; 362/293; 427/162
See application file for complete search history.

(56) References Cited

U.S. PATENT DOCUMENTS

| | | | | |
|---|---|---|---|---|
| 3,561,993 A * | 2/1971 | Geffcken | ............... | 427/162 |
| 4,076,393 A * | 2/1978 | Bates | ............... | 359/892 |
| 5,371,543 A * | 12/1994 | Anderson | ............... | 348/270 |
| 5,868,482 A | 2/1999 | Edinger et al. | | |
| 6,475,557 B1 * | 11/2002 | Mori et al. | ............... | 427/162 |
| 6,876,505 B2 * | 4/2005 | Niwa | ............... | 359/891 |
| 6,999,251 B2 * | 2/2006 | Kao et al. | ............... | 359/891 |
| 2004/0084397 A1 * | 5/2004 | Kamei et al. | ............... | 216/5 |
| 2004/0246218 A1 * | 12/2004 | Takao | ............... | 345/88 |
| 2005/0030659 A1 * | 2/2005 | Asakawa | ............... | 359/892 |

* cited by examiner

*Primary Examiner*—Leonidas Boutsikaris
(74) *Attorney, Agent, or Firm*—Townsend and Townsend and Crew LLP

(57) ABSTRACT

A process for making a unitary color filter disc includes the steps of preparing a disc member having an annular surface, and providing a plurality of differently colored segments on the annular surface. Each of the colored segments is provided by partially masking the annular surface to expose a part of the annular surface and by directly depositing a coloring film on the exposed part of the annular surface.

2 Claims, 11 Drawing Sheets

COLOR FILTER DISC AND PROCESS OF MAKING THE SAME

CROSS-REFERENCE TO RELATED APPLICATION

This application claims priority of Taiwanese Application No. 092102035, filed on Jan. 29, 2003.

BACKGROUND OF THE INVENTION

1. Field of the Invention

The invention relates to a color wheel assembly, more particularly to a color filter disc and a color wheel assembly including the color filter disc and the process of making the same.

2. Description of the Related Art

Referring to FIGS. 1 to 3, a conventional optical projection device, as disclosed in U.S. Pat. No. 5,868,482, is shown to include a color wheel assembly 1, a light source 2, a picture generating device 3, an optical projection system 4, and a screen 5. The color wheel assembly 1 has a motor 101, a carrier 102 mounted on a shaft of the motor 101, an adhesive layer 103 coated on the carrier 102, three sector-shaped filter segments 104 that are adhered to the adhesive layer 103 and that combine to form a ring shape, and a retaining ring 15 for retaining the filter segments 104 on the carrier. Accordingly, when the motor 101 actuates rotation of the carrier 102, light beams projected from the light source 2 can pass through the filter segments 104 in sequence, and to the picture generating device 3, after which, the picture produced by the picture generating device 3 is projected on the screen 5 through the optical projection system 4.

In general, the rotational speed provided by the motor 101 for the filter segments 104 is related to the picture refresh rate, and is in a range of several thousand revolutions per minute. As such, during rotation, the filter segments 104 can encounter considerable centrifugal forces of up to a thousand times greater than the weight thereof.

Referring again to FIG. 3, the filter segments 104 are cut from three individual plates 6, which are respectively coated with different colors, such as red (R), green (G), and blue (B). Then, they are adhered to the carrier 102 (see FIG. 2) so as to form a ring shape.

Since the filter segments 104 are not formed integrally, during high-speed rotation, problems of imbalance due to non-uniform tolerable strengths can occur. Furthermore, since the filter segments 104 have to be cut from three separate plates 6, which are colored beforehand and are thereafter adhered to the carrier 102, not only is the production both troublesome and inconvenient, control of the stability and preciseness of the filter segments 104 are also difficult.

SUMMARY OF THE INVENTION

Therefore, the main object of the present invention is to provide a process for making a unitary color filter disc that is relatively simple and that can enhance production efficiency.

Another object of the present invention is to provide a color wheel assembly having a unitary color filter disc that is suitable for high-speed rotation and that can be fabricated with relative ease.

According to one aspect of this invention, a process for making a unitary color filter disc comprises the steps of preparing a disc member having a central hole, an outer periphery around the central hole, and an annular surface extending between the central hole and the outer periphery, and providing a plurality of differently colored segments on the annular surface, wherein each of the colored segments is provided by partially masking the annular surface to expose a part of the annular surface and by directly depositing a coloring film on the exposed part of the annular surface.

According to another aspect of this invention, a unitary color filter disc comprises a disc member and a plurality of differently colored segments. The disc member includes a central hole, an outer periphery around the central hole, and an annular surface between the central hole and the outer periphery. The differently colored segments are provided on the annular surface, wherein each of the colored segments is provided by partially masking the annular surface to expose a part of the annular surface and by depositing a coloring film directly on the exposed part of the annular surface.

According to a further aspect of this invention, a color wheel assembly comprises a motor having a rotary shaft, a carrier mounted on the rotary shaft, a disc member, a cover plate, and a fastening unit. The disc member is mounted on the rotary shaft, and includes a central hole, an outer periphery around the central hole, an annular surface between the central hole and the outer periphery, and a plurality of differently colored segments provided on the annular surface. Each of the colored segments is provided by partially masking the annular surface to expose a part of the annular surface and by directly depositing a coloring film on the exposed part. The cover plate covers a portion of the disc member around the central hole, and presses the portion of the disc member against the carrier. The fastening unit is provided for fastening the cover plate to the carrier.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
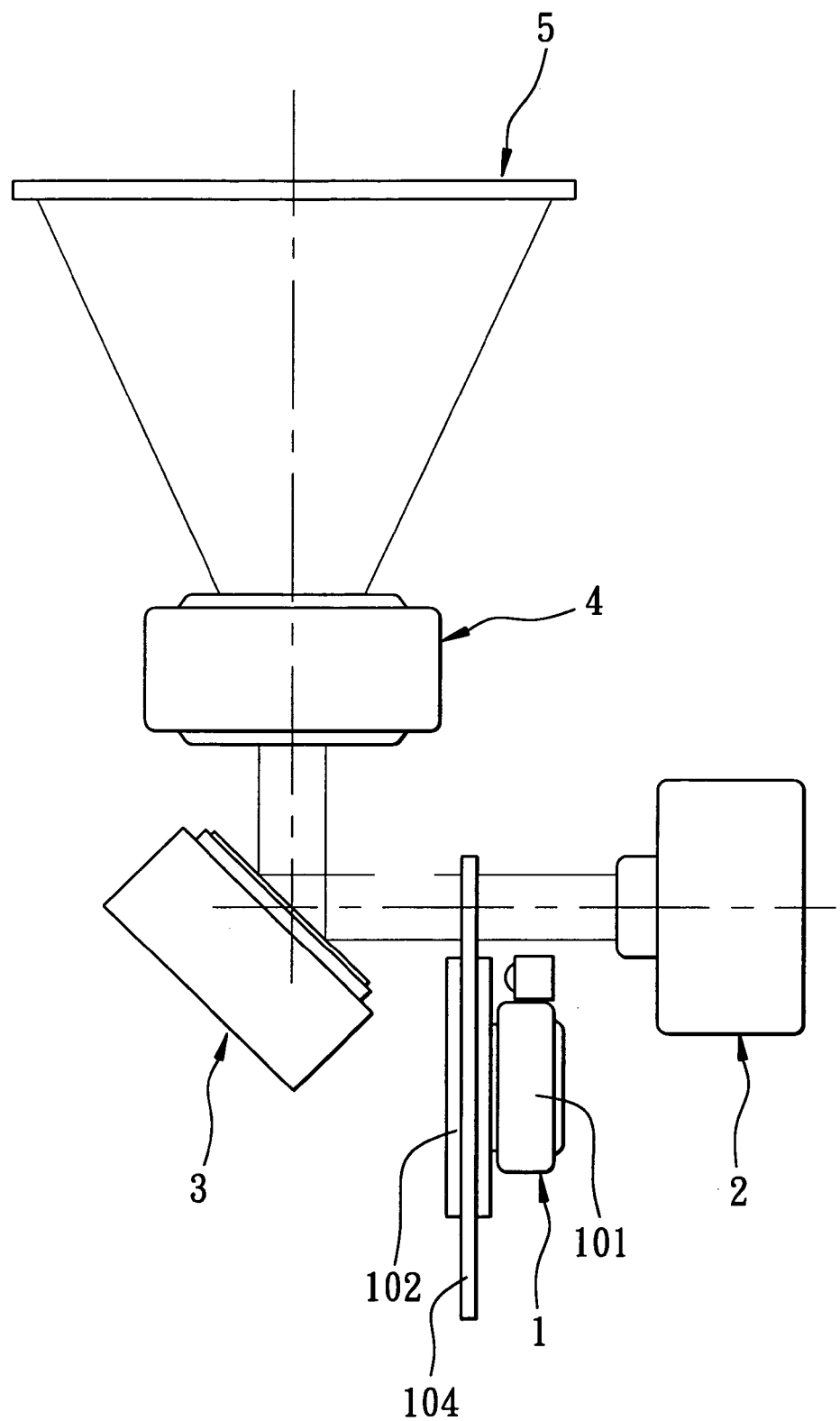
FIG. 1 is a schematic view of a conventional optical projection device disclosed in U.S. Pat. No. 5,868,482.
Figure 2:
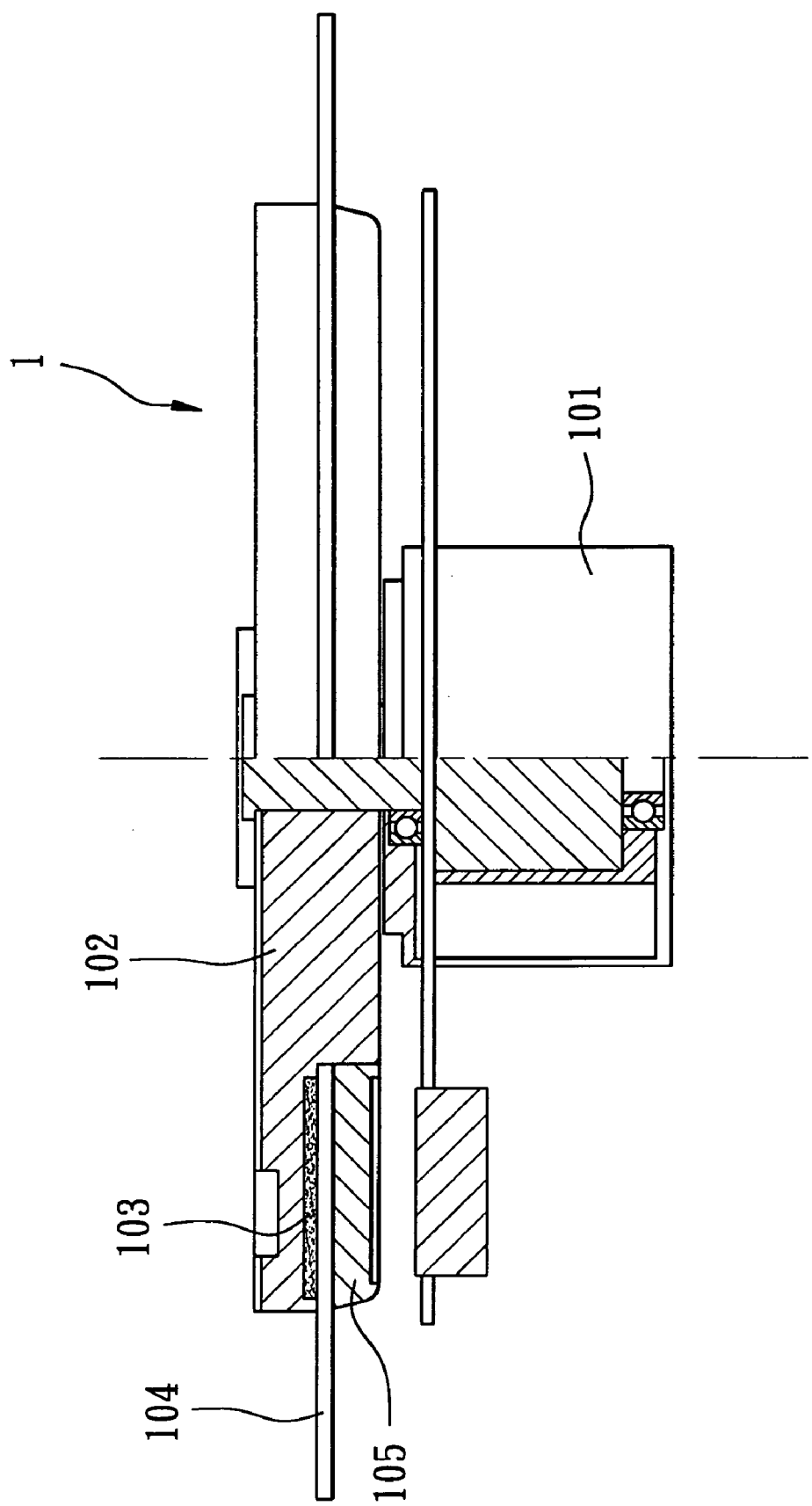
FIG. 2 is a partly sectional view of a color wheel assembly of the conventional optical projection device.
Figure 3:
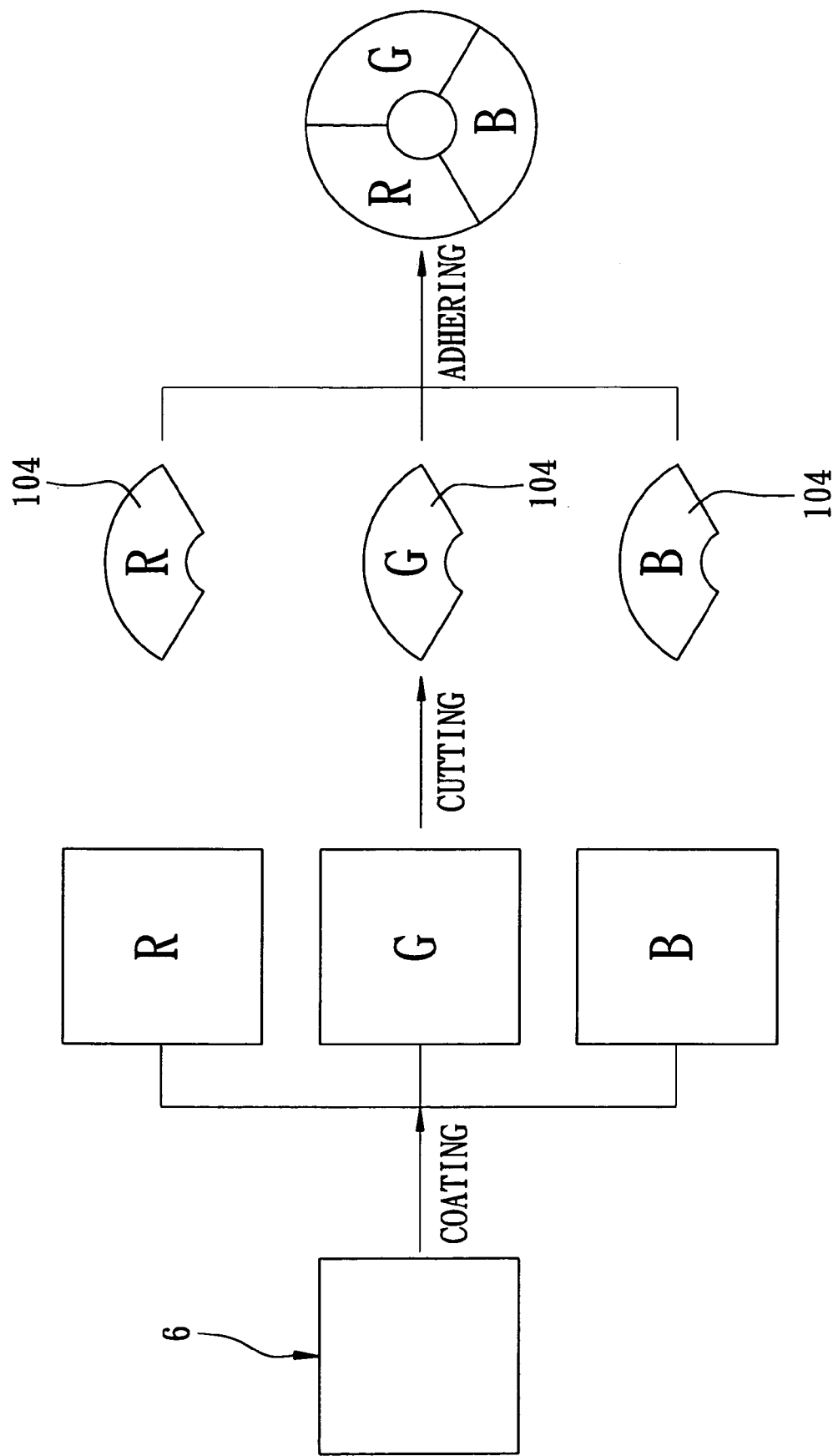
FIG. 3 illustrates consecutive steps for forming a color filter of the conventional color wheel assembly.
Figure 4:
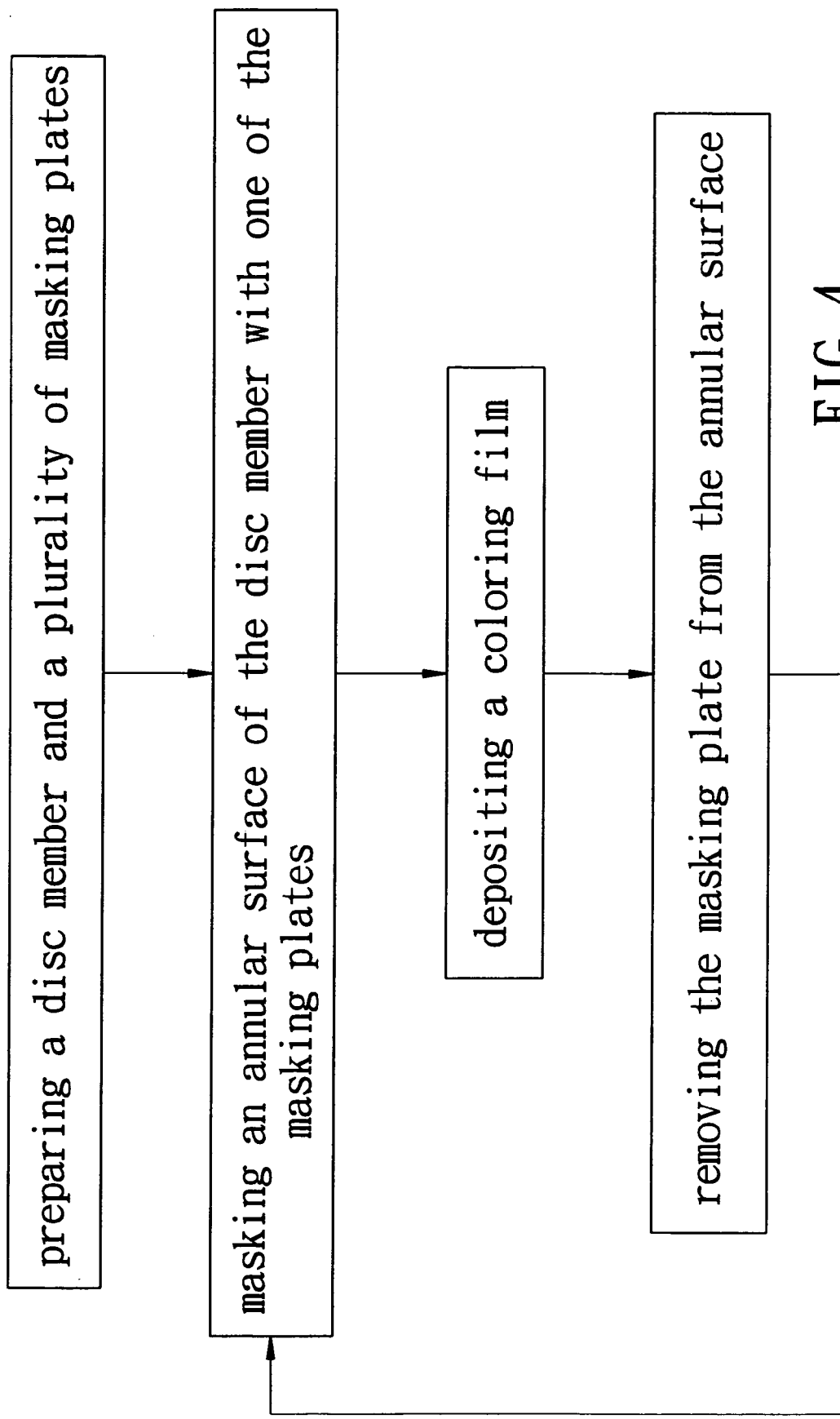
FIG. 4 is a flow chart illustrating the preferred embodiment of the process for making a color filter disc according to the present invention.

Referring to FIGS. 4 to 7, the preferred embodiment of a process for making a color filter disc according to the present invention is shown to comprise the steps: (a) preparing a disc member 10, three lateral masking plates 20, 30, 40, a graduated masking plate 50, and a positioning device 60; (b) placing one of the masking plates 20, 30, 40, 50 concentrically over an annular surface 13 of the disc member 10 to partially mask the annular surface 13 and to expose parts of the annular surface 13; (c) depositing coloring films on the exposed parts of the annular surface 13; (d) removing the masking plate 20, 30, 40 or 50 from the annular surface 13; and (e) repeating steps (b), (c), and (d).

The disc member 10 has a central hole 11, and an outer periphery 12 around the central hole 11. The annular surface 13 extends between the central hole 11 and the outer periphery 12.

Each of the lateral masking plates 20, 30, 40 has a circumferential outer periphery 21, 31, 41 corresponding to the outer periphery 12 of the disc member 10, two opposite cutout parts 22, 32, 42, each of which extends inwardly from the circumferential outer periphery 21, 31, 41 and is formed as a truncated sector shape, and a positioning hole 23, 33, 43.

The graduated masking plate 50 has a positioning hole 52, and a plurality of annularly spaced-apart graduation holes 51 surrounding the positioning hole 52. The masking plate 20 further has a groove portion 24 around the positioning hole 23 for receiving the graduated masking plate 50 therein, and a plurality of slots 25 to be in alignment with the graduation holes 51.

The positioning device 60 includes a positioning post 61, a first screw nut 62, a first packing ring 63, a pressed plate 64, a second packing ring 65, and a second screw nut 66. The positioning post 61 has a first threaded section 611, a first positioning section 612, a second positioning section 613, and a second threaded section 614. The pressed plate 64 has a positioning hole 641 with a cross-sectional shape corresponding to that of the first positioning section 612. The disc member 10 is sleeved on the first positioning section 612 through the central hole 11. The positioning holes 52, 23, 33, 43 in each of the graduated masking plate 50 and the masking plates 20, 30, 40 has a cross-sectional shape corresponding to that of the second positioning section 613 so that the graduated masking plate 50 and the masking plates 20, 30, 40 can engage the second positioning section 613 when individually mounted on the positioning post 61.

Figure 5:
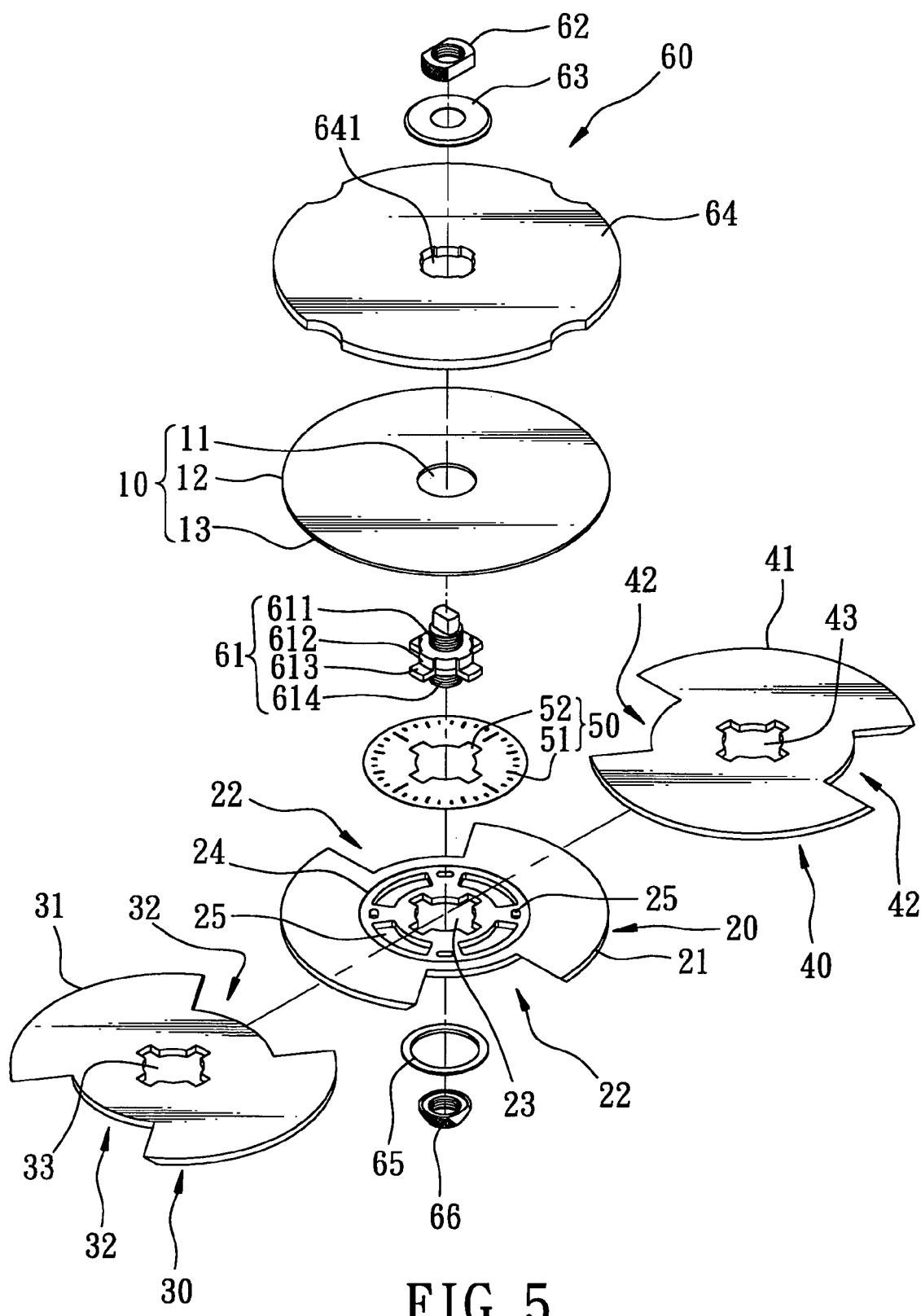
FIG. 5 is an exploded perspective view of the color filter disc of the preferred embodiment.
Figure 6:
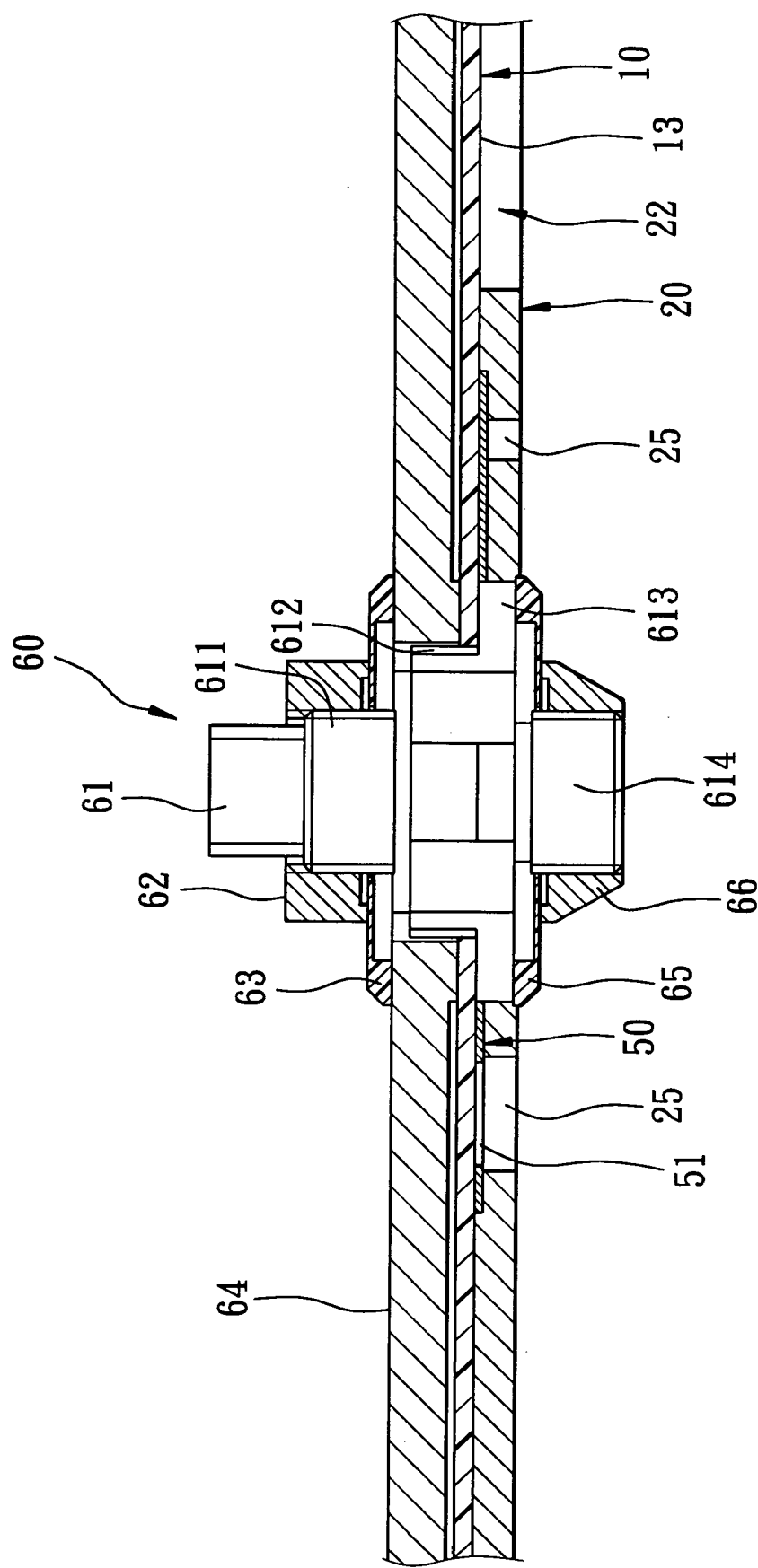
FIG. 6 is an assembled sectional view of the color filter disc of FIG. 5.

Referring to FIGS. 5 and 6, after the disc member 10, the pressed plate 64, and the first packing ring 63 are sleeved consecutively on the first positioning section 612 and the first threaded section 611, the first screw nut 62 is fastened threadedly to the first threaded section 611 so as to fix the disc member 10, the pressed plate 64, and the first packing ring 63 on the positioning post 61. Then, the graduated masking plate 50, the masking plate 20, and the second packing ring 65 are consecutively sleeved on the second positioning section 613 and the second threaded section 614, after which, the second screw nut 66 is fastened threadedly to the second threaded section 614 so that the graduated masking plate 50, the masking plate 20, and the second packing ring 65 are fixed on the positioning post 61. At this time, the graduated masking plate 50 is clamped between the disc member 10 and the masking plate 20, and the masking plate 20 and the graduated masking plate 50 are placed concentrically over the annular surface 13 of the disc member 10 so as to expose parts of the annular surface 13.

Figure 7:
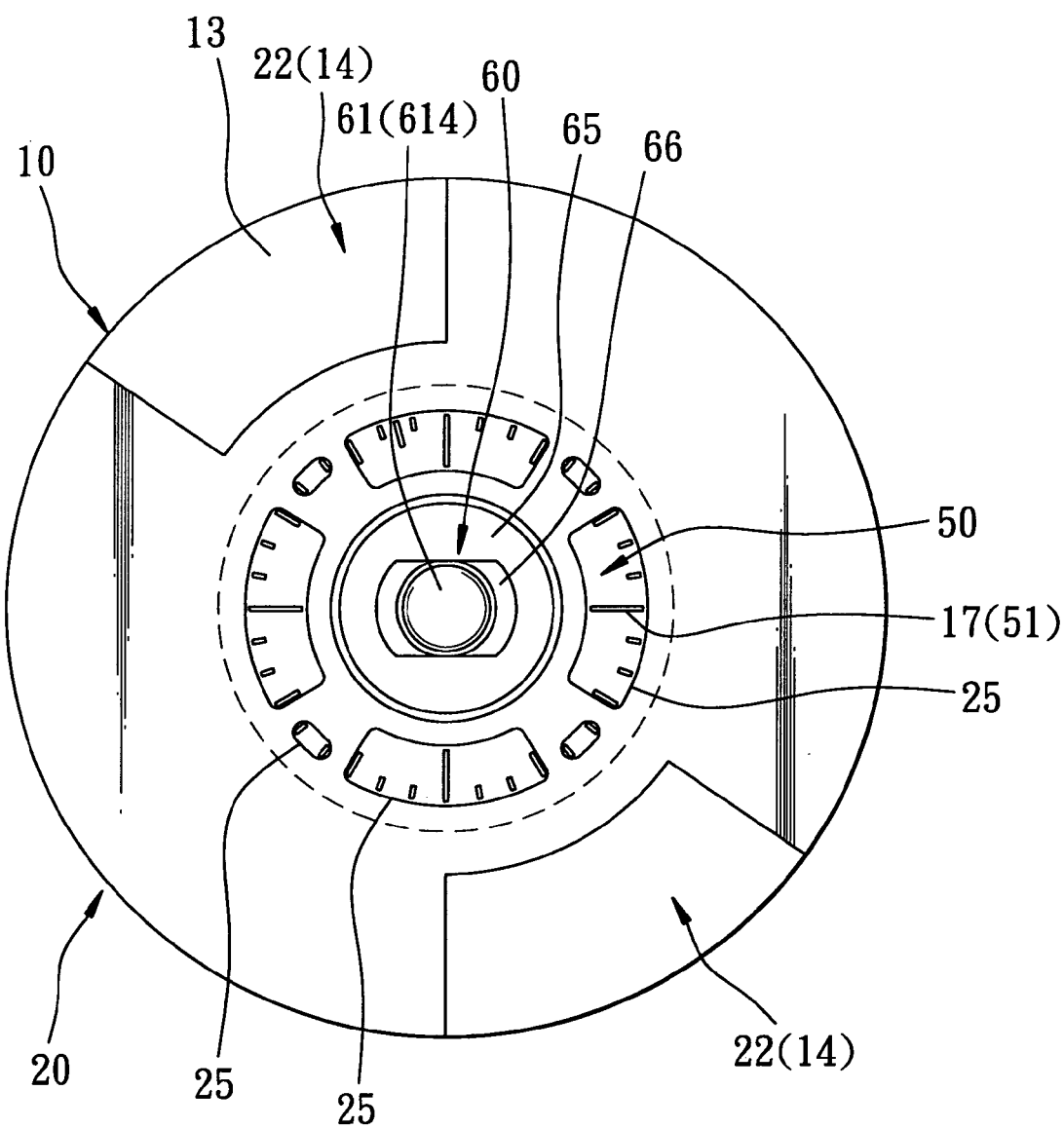
FIG. 7 is a schematic view of the color filter disc of FIG. 6.

Referring to FIGS. 6 and 7, in this embodiment, a color processing is carried out by vapor deposition. Coloring films are deposited directly on the exposed parts of the annular surface 13 by passing respectively through the cutout parts 22, the slots 25, the graduation holes 51, and onto the exposed parts of the annular surface 13. The annular surface 13 of the disc member 10 is thus formed with two colored segments 14 and graduation marks 17. In this embodiment, the color of the colored segments 14 and the graduation marks 17 is blue (B).

Figure 8:
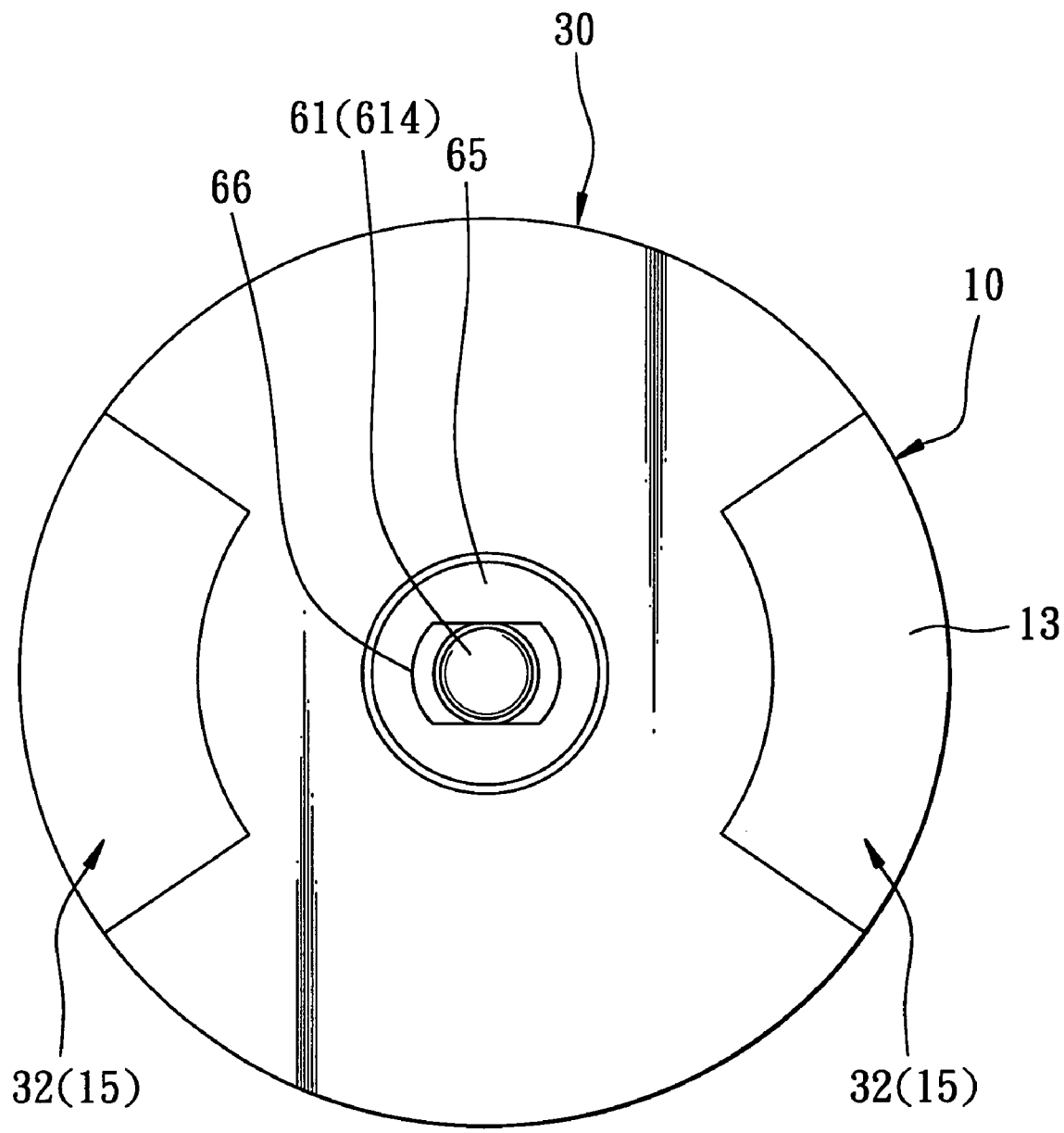
FIG. 8 is a view substantially similar to FIG. 7, illustrating a masking plate placed concentrically over a disc member.

Afterwards, the graduated masking plate 50 and the masking plate 20 are removed from the disc member 10 by detaching the second screw nut 66, and the steps (b), (c), and (d) of the process are repeated. Particularly, the masking plate 30 and the second packing ring 65 are next sleeved on the second positioning section 613 (see FIG. 5) and the second threaded section 614. Then, the second screw nut 66 is fastened to the second threaded section 614. At this time, the masking plate 30 is placed concentrically over the annular surface 13 of the disc member 10. Coloring films are deposited directly on the exposed parts of the annular surface 13 by passing through the cutout parts 32, and onto the exposed parts of the annular surface 13 so as to form two colored segments 15, as shown in FIG. 8. In this embodiment, the color of the colored segments 15 is red (R). Afterwards, the second screw nut 66 is loosened to remove the masking plate 30 from the disc member 10.

Figure 9:
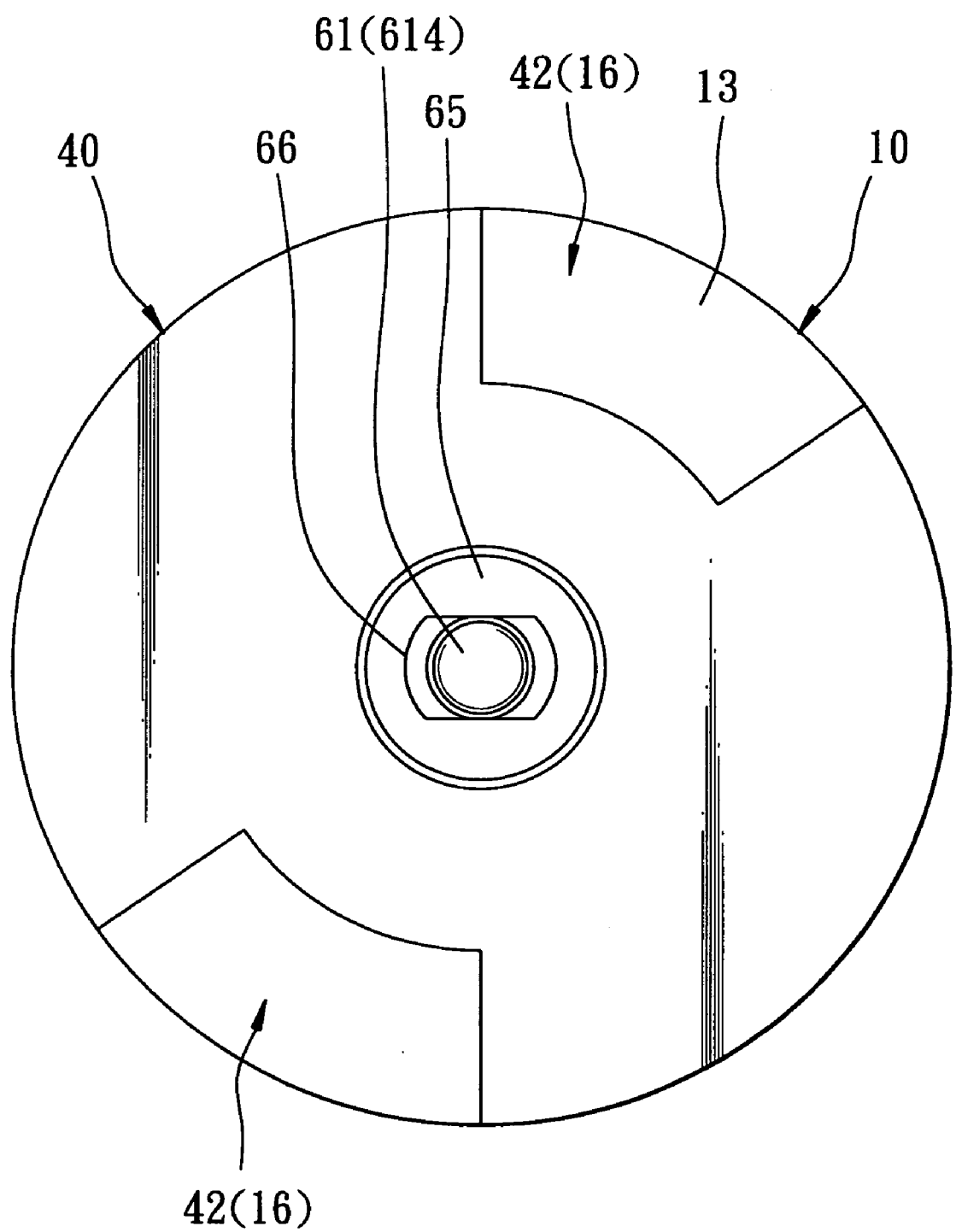
FIG. 9 is a view substantially similar to FIG. 7, illustrating another masking plate placed concentrically over the disc member.

Subsequently, the masking plate 40 and the second packing ring 65 are sleeved on the second positioning section 613 (see FIG. 5) and the second threaded section 614, after which, the second screw nut 66 is fastened to the second threaded section 614. At this time, the masking plate 40 is placed concentrically over the annular surface 13 of the disc member 10. Coloring films are similarly deposited directly on the exposed parts of the annular surface 13 bypassing respectively through the cutout parts 42, and onto the exposed parts of the annular surface 13 so as to form two colored segments 16, as shown in FIG. 9. In this embodiment, the color of the colored segments 16 is green (G). Afterwards, the second screw nut 66 is loosened to remove the masking plate 40 from the disc member 10.

It should be noted that the graduation marks 17 in this embodiment are formed on the annular surface 13 of the disc member 10 within a region surrounded by the colored segments 14, 15, 16, that each of the colored segments 14, 15, 16 has a truncated sector shape, and that the colored segments 14, 15, 16 are disposed annularly along the outer periphery 12 of the disc member 10.

Figure 10:
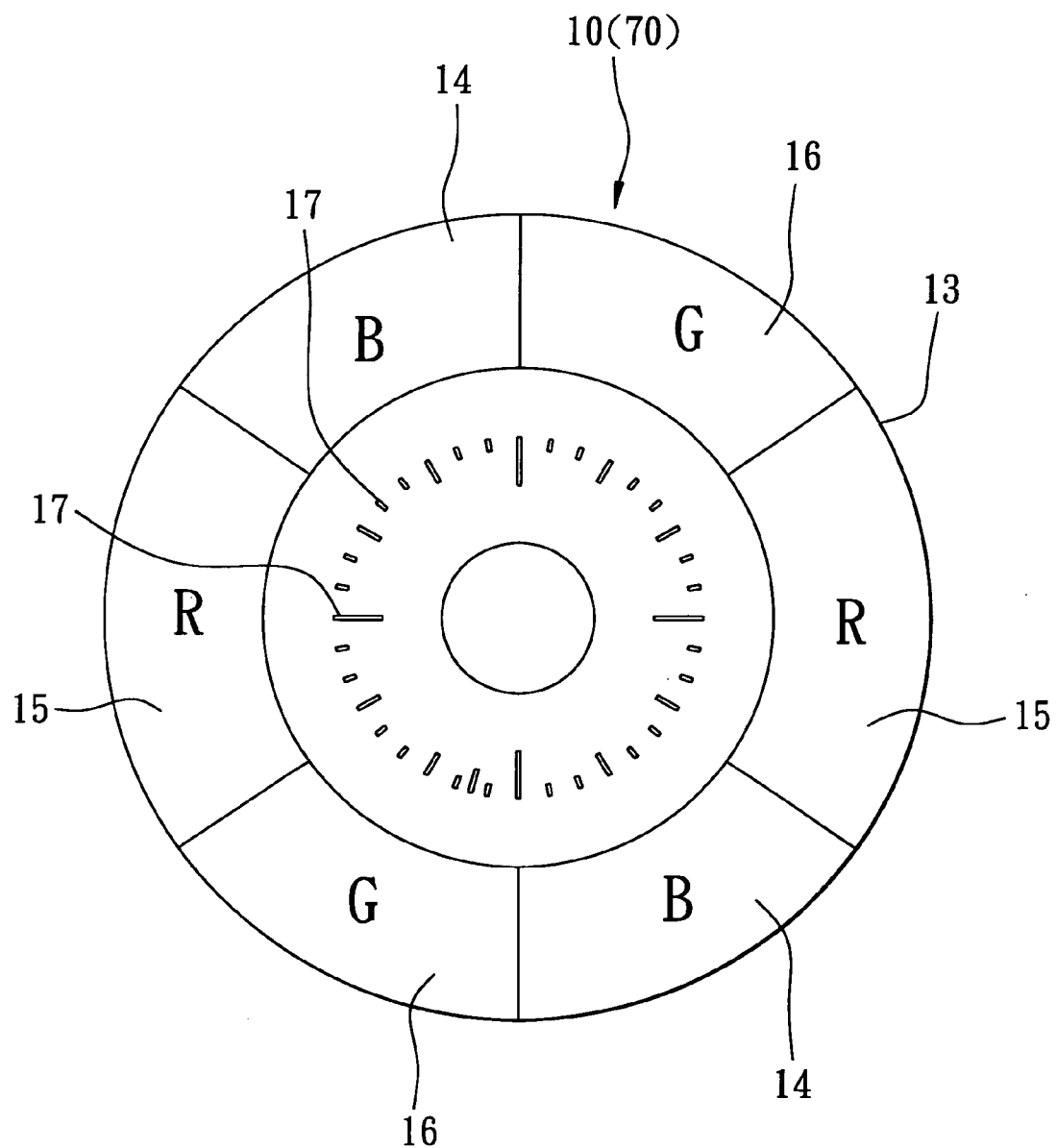
FIG. 10 is a schematic view of a unitary color filter disc prepared according to the process of the preferred embodiment.

Referring to FIG. 10, after the deposition of the coloring films with the use of the masking plates 20, 30, 40 (see FIG. 5) and the graduated masking plate 50 (see FIG. 5), the annular surface 13 of the disc member 10 is formed with alternating colored segments 14, 15 and 16, and graduation marks 17, thereby forming a unitary color filter disc 70 having three colors.

Figure 11:
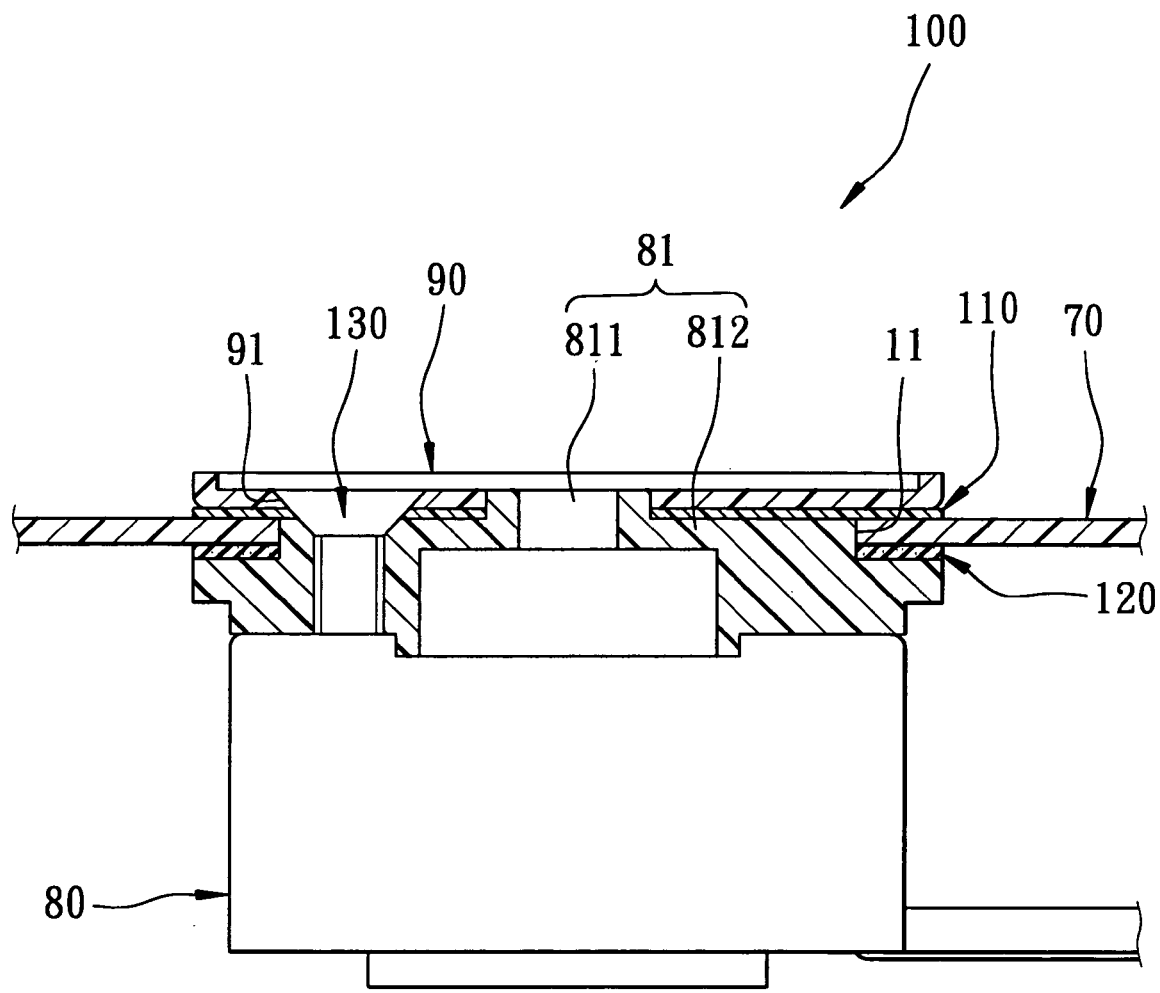
FIG. 11 is a sectional view of a color wheel assembly incorporating the unitary color filter disc of the present invention.

Referring to FIG. 11, the unitary color filter disc 70 of the present invention is assembled on a color wheel assembly 100, which includes a motor 80, a cover plate 90, a first packing ring 110, a second packing ring 120, and a plurality of fastening units 130.

The motor 80 has a rotary assembly 81 that includes a rotary shaft 811, and a carrier 812 mounted on a free end of the rotary shaft 811. The color filter disc 70 is mounted on the carrier 812 through the central hole 11.

The cover plate 90 covers a portion of the color filter disc 70 around the central hole 11 and presses that portion of the color filter disc 70 against the carrier 812. The cover plate 90 has a radius larger than the radius of the central hole 11, and a plurality of through holes 91 for extension of the fastening units 130 respectively therethrough.

The first packing ring 110 is clamped between the cover plate 90 and the color filter disc 70. The second packing ring 120 is clamped between the color filter disc 70 and the carrier 812.

The fastening units 130, in this embodiment, are screw members that extend respectively through through holes 91 (only one is shown in FIG. 11) in the cover plate 90 and the central hole 11 so as to fasten the cover plate 90 to the carrier 812, thereby positioning tightly the color filter disc 70 on the carrier 812. When the rotary shaft 811 actuates rotation of the carrier 812, the color filter disc 70 rotates together with the carrier 812.

The advantages of the preferred embodiment can be summarized as follows:

1. Through the use of masking plates 20, 30, 40 and direct deposition of coloring films on exposed parts of the annular surface 13 of the disc member 10, the annular surface 13 maybe formed with alternating colored segments 14, 15, 16, thereby producing a unitary color filter disc 70, which is unlike the conventional filter segments 104 produced from individual pieces 6 that are colored separately and that are combined to form a ring-shaped filter disc. Thus, the color processing in the present invention is not only convenient, but is also simple. Production efficiency is increased, and product stability and accuracy are high.

2. In the unitary color filter disc 70 of the present invention, different colors are formed by direct vapor deposition on one single disc member 10. As such, when the color wheel assembly 100 of the present invention is applied to high-speed rotation, the problems of imbalance due to non-uniform tolerable strengths encountered in the conventional color wheel assembly 1 are avoided, so that smooth rotation of the color wheel assembly 100 of the present invention can be ensured. Furthermore, the color filter disc 70 of the present invention can be assembled easily on the color wheel assembly 100 with the use of the fastening units 130.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A process for making a unitary color filter disc, comprising:
   preparing a disc member having a central hole, an outer periphery around said central hole, and an annular surface extending between said central hole and said outer periphery;
   providing a plurality of differently colored segments on said annular surface, wherein each of said colored segments is provided by partially masking said annular surface to expose a part of said annular surface and by directly depositing a coloring film on said part of said annular surface;
   providing a plurality of lateral masking plates each having a cutout part, wherein each of said lateral masking plates is placed concentrically over said annular surface to partially mask said annular surface and to expose said part of said annular surface, and wherein each of said masking plates has a circumferential outer periphery, said cutout part extending inwardly from said circumferential outer periphery and being formed as a truncated sector shape;
   providing a graduated masking plate which has a plurality of annularly spaced apart graduation holes;
   placing concentrically said graduated masking plate over said surface of said disc member; and
   forming directly graduation marks through said graduation holes on said surface within a region surrounded by said differently colored segments.

2. A unitary color filter disc comprising:
   a disc member including a central hole, an outer periphery around said central hole, and an annular surface between said central hole and said outer periphery;
   a plurality of differently colored segments provided on said annular surface, wherein each of said colored segments is provided by partially masking said annular surface to expose a part of said annular surface and by depositing a coloring film directly on said part of said annular surface; and
   a plurality of graduation marks formed on said annular surface in a region surrounded by said colored segments;
   wherein each of said colored segments has a truncated sector shape, said colored segments being disposed annularly along said outer periphery.

* * * * *